United States Patent [19]

Fukushima

[11] 4,073,874
[45] Feb. 14, 1978

[54] RECOVERY OF CHLORINE FROM IRON CHLORIDE

[75] Inventor: Seitaro Fukushima, Omiya, Japan

[73] Assignee: Mitsubishi Kinzoku K.K., Tokyo, Japan

[21] Appl. No.: 641,583

[22] Filed: Dec. 17, 1975

Related U.S. Application Data

[63] Continuation-in-part of Ser. No. 574,043, May 2, 1975, abandoned, which is a continuation of Ser. No. 463,838, April 24, 1974, abandoned.

[30] Foreign Application Priority Data

Apr. 28, 1973 Japan .................................. 48-48941

[51] Int. Cl.² .......................... C01B 7/03; C01B 7/02; C01G 49/06
[52] U.S. Cl. .................................... 423/500; 423/633; 423/659
[58] Field of Search ........................ 423/633, 659, 500

[56] References Cited

U.S. PATENT DOCUMENTS

| | | | |
|---|---|---|---|
| 2,619,434 | 11/1952 | Kraus | 423/633 X |
| 3,325,252 | 6/1967 | Wikswo | 423/633 X |
| 3,351,427 | 11/1967 | Wendell | 423/633 X |
| 3,361,525 | 1/1968 | De Rycke | 423/633 X |
| 3,486,913 | 12/1969 | Zirngibl | 423/633 X |
| 3,695,840 | 10/1972 | Pfender | 423/659 X |
| 3,725,526 | 4/1973 | Pieri | 423/659 X |

*Primary Examiner*—Edward Stern
*Attorney, Agent, or Firm*—Wenderoth, Lind & Ponack

[57] ABSTRACT

In the recovery of chlorine from iron chloride by causing reaction between an oxidizing gas and a gas containing iron chloride as the predominant constituent within an oxidation furnace, the initial meeting of the two reacting gases is caused to take place in an unobstructed space within the furnace, the oxygen being injected into the furnace in directions and at a velocity such that the resulting turbulent flow due to the initial collision of the two gases will not reach the furnace wall, whereby depositing of Fe₂O₃ on the furnace wall is reduced to a minimum.

10 Claims, 6 Drawing Figures

RECOVERY OF CHLORINE FROM IRON CHLORIDE

CROSS REFERENCE

This application is a continuation-in-part of Ser. No. 574,043, filed May 2, 1975 (now abandoned) which in turn is a continuation application of Ser. No. 463,838, filed Apr. 24, 1974 (now abandoned).

BACKGROUND OF THE INVENTION

This invention relates to a process and apparatus for recovering chlorine by causing oxygen or a gas containing oxygen to act on iron chloride or a gas containing iron chloride as the predominant constituent.

More specifically, the invention relates to a process for recovering chlorine from iron chloride, which comprises introducing into an oxidation furnace iron chloride or a gas containing iron chloride as the predominant constituent (hereinafter referred to inclusively as "iron chloride gas") and causing oxygen or a gas containing molecular oxygen (hereinafter referred to inclusively as an "oxidizing gas") to react with the iron chloride gas thereby to prevent adhesion of the iron oxide thus produced to the furnace walls and, at the same time, to recover chlorine with high efficiency, whereby stable operation of the oxidation furnace over a long period is made possible.

The basic concept of causing iron chloride and oxygen to react thereby to recover chlorine is known, and various processes for reducing this concept to practice have been proposed as in the following references.

1. U.S. Pat. No. 3,376,112.

The specification discloses a method wherein $FeCl_3$ is rendered into the double salt $NaFeCl_4$ with NaCl, and for causing this double salt to react with oxygen, a moving-bed type oxidation furnace packed with small spheres of inactive material of a diameter of approximately 3 mm. is used, the movements of these small spheres functioning to prevent the $Fe_2O_3$ of the reaction products from adhering to the interior surfaces of the furnace. By this method, however, since the furnace is filled with the small spheres, the processing capacity per unit interior volume of the furnace is small, and if a large furnace is used, the movements of the small spheres therewithin can become a less uniform flow, and adhesion of $Fe_2O_3$ at parts where this flow can become stagnant cannot be avoided.

2. U.S. Pat. No. 2,642,339.

A fluidized bed oxidation furnace in which $Fe_2O_3$ powder is utilized as a catalyst for oxidation reaction of iron chloride is proposed. $Fe_2O_3$ of the reaction products which adheres to and tends to grow on the furnace walls is scraped off by the flow of the $Fe_2O_3$ powder arising from the blowing in of the reaction gases. However, a method of solving the problem of solidification of the fluidized bed due to sintering of the iron oxide formed which can occur locally at the part where the reaction gases are blown in is not indicated with respect to the case of a practical furnace of large scale. Furthermore, in the case where the origin of formation of the iron chloride is a chloridization furnace of fluidized bed type, the process involves a two-stage fluidized reaction in which the above-mentioned oxidation furnace is added, and complication control procedures may be required in the operation.

3. U.S. Pat. No. 3,325,252.

An oxidation furnace of flame type is proposed. In the use of this furnace, iron chloride and oxygen are injected through respective coaxial nozzles and thus caused to react. It has been found through my experience, however, that the $Fe_2O_3$ adheres rapidly in great quantity to the tips of the injection nozzles and the furnace wall in the vicinity of the injection nozzles in this type of furnace, whereby the furnace can become clogged in a short time.

4. U.S. Pat. No. 3,092,456.

Through the use of an oxidation furnace of the same type as in the above reference (3), CO or fine powder coke is blown in onto the furnace walls or discharge pipe parts where adhesion of $Fe_2O_3$ occurs with the aim of preventing this adhesive deposition of $Fe_2O_3$ by causing the free oxygen remaining after the reaction to combine with the CO or fine powder coke.

5. French Pat. No. 1,315,838.

It is disclosed that adhesion of $Fe_2O_3$ can be prevented by maintaining the temperature of the oxidation furnace from 10° to 50° C higher than the reaction gas temperature.

However, so far as I know, none of the oxidation furnaces of the above cited proposed methods has been successfully reduced to industrial practice. The principal reason for this may be that the adhesive depositing of the $Fe_2O_3$ of the reaction products on the furnace walls cannot be completely prevented and inevitably gives rise to clogging of the furnace, whereby the operation of the furnace must be frequently stopped for removing the adhesive deposit. Furthermore, in the case where a large furnace is used in the process of each of the above cited patents, the practice of the invention is accompanied by technically great difficulties, whereby such a measure is not necessarily practical. Further, while it is required to strictly control the reaction temperature distribution and residence time at each reaction temperature, and some of the above cited processes refer to the division of a reaction furnace into two zones, such conventional processes are not considered sufficient in controlling the reaction temperature distribution in relation to the residence time at each temperature.

SUMMARY OF THE INVENTION

It is an object of this invention to solve the above-described problems in providing a process for recovering chlorine from iron chloride whereby the chlorine can be recovered with high yield, and, at the same time, stable process operation over a long period becomes possible.

As a result of various studies carried out with the aim of achieving the above object, I have discovered that this object can be achieved by using a hollow reaction furnace and predetermining the respective charging directions and velocities of reaction gases. More specifically, I have discovered that the deposition of iron oxide is most likely to occur on a part of the furnace wall within or surrounding a zone in the hollow furnace (hereafter referred to as "mixing zone") wherein the oxidizing gas and the iron chloride gas initially meet with each other and are mixed, and the iron oxide deposited within the mixing zone is likely to be sintered to form scale thereof which finally causes the clogging of the furnace, whereas in a zone subsequent to the mixing zone, a little deposition of iron oxide actually occurs but the thus deposited iron oxide is soft and is not sintered to form a hard scale thereof or does not increase its thickness, thus never clogging the furnace. This invention is based on these findings.

According to this invention in one aspect thereof, briefly summarized, there is provided a process for recovering chlorine from iron chloride by causing an oxidizing gas to react with an iron chloride gas in an oxidation furnace, in which process the initial meeting of the two gases is caused to occur in an unobstructed zone within the furnace, and the oxidizing gas is introduced into the furnace in a direction and at a velocity such that turbulent flow resulting from collision of the two gases will not reach the furnace wall thereby to prevent excessive adhering and growing as a layer of $Fe_2O_3$ in the reaction product on the interior wall surface of the furnace.

According to another aspect of the invention, there is provided a process for controlling the temperature distribution of an oxidation furnace by controlling a heat radiation from the furnace wall and recycling a part of the products from the oxidation furnace containing unreacted iron chloride to a part along the length of the oxidation furnace.

The nature, utility, and further features of the invention will be more clearly apparent from the following detailed description beginning with a consideration of general aspects and concluding with examples of specific illustrating preferred embodiments of the invention.

DETAILED DESCRIPTION

The term "iron chloride gas" used herein is intended to include substantially pure vapor of iron chloride (including ferric and ferrous chlorides), and a mixed gas containing iron chloride as the principal constituent, more specifically 30% by volume or more thereof, such as a gas produced in a process for chlorinating ilumenite or like titaniferous iron ores, or other ores containing iron oxide, and the iron chloride gas can contain as other constituents thereof carbon dioxide, carbon monoxide, nitrogen, and a small portion of chlorine, oxygen, manganese chloride, titanium chloride and other chlorides. Here, "vapor of iron chloride" includes iron chloride vapor discharged directly from chlorination processes as are mentioned above, and iron chloride vapor obtained by cooling an effluent gas from such chlorination processes to isolate solid iron chloride and revaporizing the thus isolated solid iron chloride. However, in a preferred embodiment of this invention, an iron chloride gas discharged from a chlorination process is introduced into an oxidation furnace of the present invention described hereinafter without intermediate cooling.

The term "oxidizing gas" used herein is intended to include oxygen and a gaseous mixture containing molecular oxygen as the principal constituent thereof, preferably at a concentration of 80% or more.

Now, this invention is described with reference to the drawings.

Figure 1:
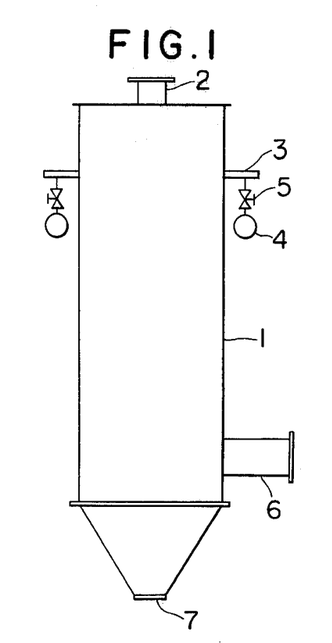
FIG. 1 is an elevation showing one example of a vertical, cylindrical oxidation furnace which is suitable for use in one embodiment of the invention, and in which an iron chloride gas is injected through an inlet mounted on the center of the top end wall (hereinafter referred to as "top end center") of the furnace in the longitudinal direction thereof along the furnace center axis.

Referring to FIG. 1, wherein one preferred embodiment of the oxidation furnace of this invention is illustrated, the oxidation furnace comprises: a closed furnace structure 1 of vertical cylindrical type; an iron chloride conduit 2 for injecting an iron chloride gas; this iron chloride conduit being mounted at the top end center of the furnace structure 1 coaxially therewith; a plurality of oxygen nozzles 3 for injecting an oxidizing gas provided around the furnace structure 1 and supplied with the oxidizing gas from an oxidizing gas supplying header or pipe 4 by way of respective valves 5; an exhaust pipe 6 connected to a lower part, preferably a part close to the lower end of the vertically straight side wall, thereof; and an extraction port 7 for extracting $Fe_2O_3$ at the bottom of the furnace structure 1.

It is possible to practice this invention with a furnace other than a furnace of cylindrical type, but such modification would not yield any particular advantages.

An iron chloride gas heated to a temperature from 700° to 1000° C is injected vertically downward into oxidation furnace 1 through iron chloride conduit 2 mounted on the top end center of the furnace. The ratio $d/D$ of the diameter of the iron chloride conduit $d$ to the furnace diameter D, should satisfy the relation $$d/D = 0.1 \text{ to } 0.25 \quad (1)$$

, and preferably be in the vicinity of 0.15. The Reynolds number Re of the iron chloride gas in the conduit therefor should satisfy the equation $$Re: Ud/\nu = (2.1 \text{ to } 8.9) \times 10^4 \quad (2)$$

wherein $\nu$ denotes the kinematic viscosity of the iron chloride gas which is calculated based on a formula for estimating the viscosity of a mixed gas, e.g. one given by, Wilke (J. Chem. Physics 18,517 (1950), and the injection velocity of the iron chloride gas U at the tip of the conduit satisfying the above equation (2) is usually within the range of from 1 to 7 m/sec. The iron chloride gas thus injected proceeds downward, while spreading in the form of a cone having a vertex angle of about 20°, to the mixing zone, in the furnace wherein the initial collision and mixing between the iron chloride gas and the oxidizing gas occur.

On the other hand, oxygen nozzles 3 are disposed radially and inwardly on the furnace side wall and lie on a plane perpendicular to the axis of the furnace, the nozzle tips being directed to the axis of the oxidation furnace. A plurality of oxygen nozzles are disposed on the side wall at equiangular intervals from each other so as not to cause any biases of the oxygen gas flows meeting at a point on the central axis. An oxidizing gas is introduced through the oxygen nozzles to collide in the mixing zone with the iron chloride gas injected through the iron chloride conduit 2 at such a velocity that the turbulence induced by the initial collision of the two gases does not reach the furnace wall. More specifically, it has been found that the oxidizing gas is injected through the oxygen nozzles at a velocity $U_o$ (m/sec) determined as follows.

The degree of the turbulence induced by the collision between the iron chloride gas and the oxidizing gas is determined on the one hand by the velocity of the iron chloride gas, and on the other hand and more directly by the velocity $U_c$ (m/sec) of the oxidizing gas, at the time of collision. From experimental results, it has been found that this value of $U_c$ should satisfy the formula $$0.1 \leq U_c/U \leq 6 \qquad (3)$$

When the velocity $U_c$ is determined from equation (3), the injection velocity $U_o$ measured at the tip of oxygen nozzles is obtained from the equation $$U_o = (D U_c)/(2 K_{ju} \gamma_o) \qquad (4)$$

wherein $D$ = diameter of the oxidation furnace ($m$), $\gamma_o$ = radius of oxygen nozzles ($m$) and $K_{ju}$ is the jet constant for momentum transfer and is estimated at 12.4 for the oxidizing gas of the present invention. The equation (4) was derived from a basic, experimental equation for showing the relationship between the jet velocity of a gas freely jetted into a similar gas atmosphere through a nozzle in a horizontal direction and the velocity thereof at a definite distance from the nozzle tip, given by J. Szeckeley et al (J. Szeckeley and N. J. Themelis: Rate Phenomena in Process Metallurgy, page 719, John Wiley and Sons Inc. (1971).

On the other hand, when the entire feed rate of the oxidizing gas is designated as $Q_o$ (Nm$^3$/sec) which is determined within the range of from the theoretical feed rate to 20% excess of the theoretical feed rate required for converting all the iron chloride (usually in the form of FeCl$_3$) in the iron chloride gas to iron oxide, i.e. required by the representative equation

$$2FeCl_3 + 3/2\ O_2 = Fe_2O_3 + 3Cl_2 \qquad (5),$$

and the number of the oxygen nozzles is disignated as $n$, the following equation exists:

$$Q_o \times (T_o/273) = \pi v_o^2 U_o n \qquad (6)$$

wherein $T_o$ (° K) is the temperature of the oxidizing gas passing through the nozzle.

It is preferable from the standpoint of uniform mixing that the oxygen nozzles are as numerous as possible within an extent allowable from economical consideration, and the number of the oxygen nozzles $n$ should not be less than 3. The radius of the oxygen nozzle is determined to satisfy the formula $$0.01 \sqrt{\frac{Q_o \times T_o}{Q \times T}} \cdot \sqrt{\frac{1}{n}} \leq \frac{\gamma_o}{D} \leq 0.18 \sqrt{\frac{Q_o \times T_o}{Q \times T}} \cdot \sqrt{\frac{1}{n}} \qquad (7)$$

wherein $T$ (° K) and $Q$ (Nm$^3$/sec) are the temperature and the feed rate of the iron chloride gas. Finally, the diameter of the oxidation furnace $D$ is so determined that the apparent Reynolds number $Re'$ of the reaction gases passing through a zone subsequent to the mixing zone will satisfy the equation $$Re' = (0.5\ to\ 1.5) \times 10^4 \qquad (8)$$

As described hereinabove, the iron chloride gas is injected into the oxidation furnace at a Reynolds number in the iron chloride gas conduit of from $2.1 \times 10^4$ to $8.9 \times 10^4$. When the Reynolds number exceeds $8.9 \times 10^4$, the iron chloride gas pierces through the layer of the oxidizing gas injected through the furnace side wall and spreads below the layer to extend the mixing zone downward and causes adherence of iron oxide scale onto a part of the side wall below the oxygen nozzles. On the contrary, when the Reynolds number is less than $2.1 \times 10^4$, the iron chloride gas is rejected by the layer of the oxidizing gas and causes insufficient mixing therewith.

A similar relationship holds true with the oxidizing gas. When the velocity $U_c$ of the oxidizing gas (m/sec) exceeds the upper limit defined by formula (3), the oxidizing gas streams injected through the respective oxygen nozzles cause too intense a collision with each other thereby causing the turbulence induced by the collision to reach the side wall or upper end wall of the oxidation furnace. In contrast thereto, when the velocity $U_c$ is lower than the lower limit defined by equation (3), the oxidizing gas rises along the furnace side wall and is sucked within the iron chloride gas in the vicinity of the tip of the iron chloride conduit to cause the adherence of iron oxide scale near the tip of the iron chloride conduit and finally clog the furnace.

As the oxygen nozzle, a single pipe nozzle of free turbulence type is preferably used the shape of which is essentially the same with that of iron chloride conduit. This type of nozzle can give the oxygen gas a conical spread having a vertex angle of about 20°. A conical nozzle for giving a larger vertex angle or a beeline nozzle for giving a smaller vertex angle is not rather suitable, since both of them are liable to increase the adherence of iron oxide scale onto the furnace walls.

The position of the oxygen nozzles on the furnace side wall is determined so that the cone of the oxidizing gas having a vertex angle of about 20° will not reach the internal surface of the top end wall when jetted freely into the furnace, that is, the vertical distance $x$ of the position downward from the internal surface of the upper end wall should be more than the value, $x_{min} = D \tan 10° = 0.176\ D$ (m). When the position of the oxygen nozzles is, however, too low, the zone above the position does not concern the reaction. Consequently, it has been found empirically that the piston of the oxygen nozzles should be determined so as to satisfy the equation $$x = 0.176 \times (1\ to\ 3)\ D\ (m) \qquad (9)$$

while taking into consideration a possible fluctuation in the conditions of the collision between the two reaction gases.

A plurality of the free turbulences of the oxidizing gas injected through a plurality of the oxygen nozzles lying on a plane perpendicular to the furnace axis and disposed radially, inwardly and at positions equiangularly distant from each other on the furnace side wall, substantially lose their momentum by their collision. The mixing of the oxidizing gas with the iron chloride gas is as well effected in the turbulent zone (mixing zone) induced by the collision therebetween.

It is preferable that the oxygen nozzles lie on a plane perpendicular to the furnace axis. When the oxygen nozzles are disposed at a certain inclination downward with respect to the above-mentioned plane, a plurality of free turbulences of the oxidizing gas do not lose their momentum in the downward direction, and the momentum in addition to the momentum of the iron chloride gas elongates the space within the furnace required for mixing the two reaction gases and eventually causes the reaction gases to merely pass along the central axis of the furnace to form a dead space in the furnace. In this case, the residence time required for the reaction is not secured and the conversion of iron chloride decreases. Moreover, when the oxygen gas is injected upward at a certain inclination with respect to the above-mentioned plane, the space required for mixing the gases is enlarged and the thus enlarged space for mixing increases the disadvantageous adherence of iron oxide scale.

With consideration for the above knowledge, the arrangement of the oxygen nozzles can be modified to some extent. Thus, it is possible to divide the oxygen nozzles into vertically distant, two sets of nozzles, the nozzles of each set being disposed at the same height on the furnace side wall, and the upper set of nozzles having a downward inclination and the lower set of nozzles having an upward inclination, the angles of both the downward and upward inclinations being substantially the same with each other, so that all the oxygen nozzles will be directed to a point on the central axis of the oxidation furnace. The above-mentioned upward or downward inclination should be 30° at the greatest with respect to a plane perpendicular to the furnace axis. In this case, the velocity U in equation is replaced by the horizontal element $U_a$ of the injection velocity U of the oxygen gas.

The oxygen gas is injected into the oxidation furnace at a temperature of from room temperature to the temperature of the iron chloride at the time of introduction thereof. For this injection, by providing an orifice at the root portion of each nozzle, or by some other method, a pressure loss of the order of from 100 to 300 mm. of $H_2O$ is applied, whereby some fluctuation occurring in the conditions during operation and the accompanying effects can be avoided. At the same time, uniform distribution of oxygen to all nozzles can be attained.

The above-described method for mixing the two reaction gases prevents the adherence of iron oxide scale which has been technically difficult to remove, thereby making it possible to operate the process continually and stably for a long period, and effective mixing of the two reaction gases is obtained thereby.

The mixing zone for the two reaction gases referred to herein is estimated as follows. Thus, the point downstream from the oxygen nozzles by $y(m)$ after which point the reaction gases form a uniform phase is roughly determined by the following equation $$y = 0.176 \times 4D \tag{10}$$

Accordingly, the mixing zone contemplated herein occupies a zone from the top end wall of the furnace to a point $x + y$ (m) downstream therefrom determined from the following equation which has been obtained by adding equations (9) and (10)

$$x + y = 0.176 \times (5 \text{ to } 7) D \tag{11}$$

Thus, the object of the invention is to prevent the turbulent flow induced by the initial collision of the two reaction gases from reaching the internal surface of the oxidation furnace within the mixing zone above estimated. This is, in other words, to let the collision of the two reaction gases and the resultant mixing be caused in a central part of the furnace and provide a dead space near the entire internal surface within the mixing zone of the furnace so as to prevent the turbulent flow induced by the collision from reaching the internal surface. By practicing the invention, such a dead space is created. Even in the dead space, for example near the oxygen nozzles, some vortex flow may occur, but such vortex flow does not affect the flow of the reaction gases and causes no formation of iron oxide scale.

Figure 6:
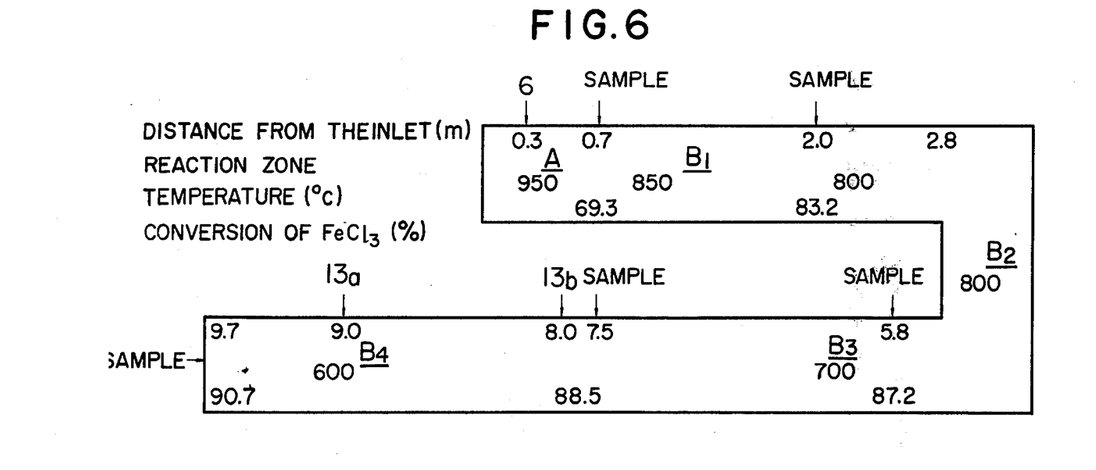
FIG. 6 is a schematic diagram showing a performance of this invention according to Example 3 described hereinafter.

The reaction zone within the furnace includes the mixing zone and the entire of the subsequent zone downstream therefrom. The reaction between the two gases is severest when they initially meet each other, and the conversion of iron chloride reaches about 50% or more within the mixing zone. However, in order to further increase the conversion, the control of both the reaction temperature distribution over the length of the furnace and the residence time at each temperature is required as shown in FIG. 6 which illustrates a result of Example 3 described hereinafter, since the reaction represented by equation (5) is a reversible reaction preferring a lower temperature and having a low reaction rate. The apparent residence time of the reaction gases in the furnace thus requires about 1.4 to about 4 minutes. Because the reaction is a reversible reaction preferring a lower reaction temperature, the temperature distribution within the furnace is so controlled that the temperature at the upper stream end is within the range of 700° to 1000° C and the downstream end for the gases is within the range of 500° to 700° C. The control of the temperature distribution is effected by controlling the heat dissipation from the furnace wall by means of controlling the thickness of the insulating material covering the furnace side wall and/or by recycling unreacted iron chloride within the effluent gas from the oxidation furnace to the reaction zone through a part of the furnace side wall. According to the process of the invention, 85% or more of the iron chloride introduced into oxidation furnace is converted into powdery iron oxide and chlorine, and the effluent gas is then treated in a gas treating process to separate iron oxide, cooled to a temperature of about 100° C and passed through a bag filter to recover a solid iron chloride together with iron oxide in a fine powder form. The thus recovered unreacted iron chloride consists of less than 30% by weight of iron chloride and more than 70% by weight of iron oxide, which is in the form of fine powder, and is injected into the oxidation furnace continuously or intermittently through a conduit pipe disposed on a part of the furnace wall where cooling is necessary, by using dry nitrogen, oxygen, air or a portion of waste gas from the chlorine recovery process coming thereafter as a conveying gas.

In the reaction zone downstream from the mixing zone, the apparent Reynolds number is preferably set within the range of from $0.5 \times 10^4$ to $1.5 \times 10^4$, and accordingly the gas flow therethrough is in a turbulent state and the reaction gases inevitably touch the furnace wall. As the result, in the zone downstream from the mixing zone, up to about 20 to 30 mm of powdery iron oxide layer is formed on the furnace wall, but the iron oxide layer remains soft, does not increase its thickness any further and is not sintered to form scale thereof. This iron oxide layer formed on the furnace side wall in the zone down-stream from the mixing zone is so soft that a part thereof sometimes falls down to the bottom of the furnace. Further, while 50% or more of the product iron oxide accompanies the oxidation furnace gas to be discharged out of the oxidation furnace, the remaining percentage of the iron oxide piles on the bottom of the furnace. The thus piled iron oxide is withdrawn continuously or intermittently into a closed container attached to the furnace bottom.

Figure 3:
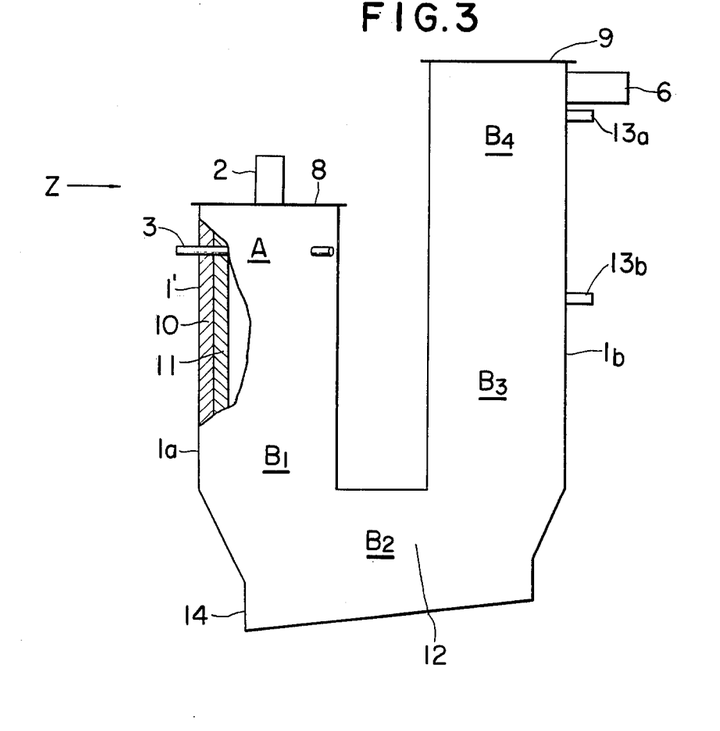
FIG. 3 is an elevation, partly exploded, showing another example of an oxidation furnace having a U-shaped structure composed of two vertical cylindrical columns with a connecting part connecting the two columns at their bottoms, in which an iron chloride gas is injected from the top end center of one of the two columns in the longitudinal direction along the column center axis.
Figure 4:
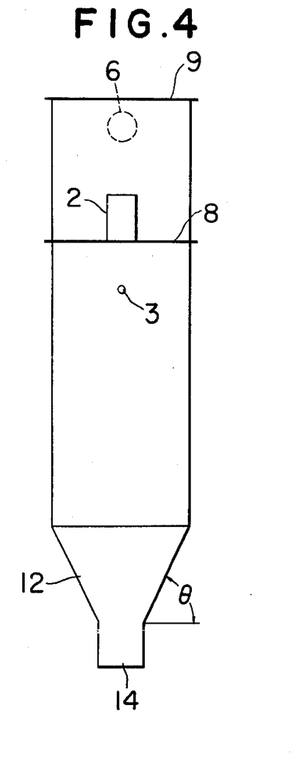
FIG. 4 is a side view of the oxidation furnace shown in FIG. 3 as viewed along a direction denoted as Z in FIG. 3.

FIGS. 3 and 4 show another construction of oxidation furnace, which has a U-shaped structure and is still more suitable for use in another embodiment of the invention. Referring now to FIGS. 3 and 4, the oxidation furnace comprises: a closed furnace structure 1 comprising two vertical cylinders 1a and 1b each having a top end wall 8 or 9 and connected by a hollow connecting member 12 communicatively with each other at their bottom ends, each of which being covered with an external covering plate 1', a layer of insulating material 10 and a layer of chlorine-proofing fire brick 11; an iron chloride conduit 2 mounted on the central part of the end wall 8 coaxially with cylinder 1a; an exhaust pipe 6 disposed on a part of the side wall of the cylinder 1b close to the top end wall 9, and at least one cooling conduit 13a or 13b for recycling unreacted iron chloride disposed on the side wall of cylinder 1a (not shown) or 1b. The connecting member 12 also constitutes the bottom floor of the oxidation furnace having a slight inclination for facilitating the withdrawal of iron oxide piled on the bottom floor, and the lowest part thereof is provided with an extraction port 14 to be connected to a closed container (not shown) for receiving the iron oxide piled on the bottom floor. The connecting member also has two side walls each having an inclination θ with respect to a horizontal plane (as shown in FIG. 4).

Figure 5:
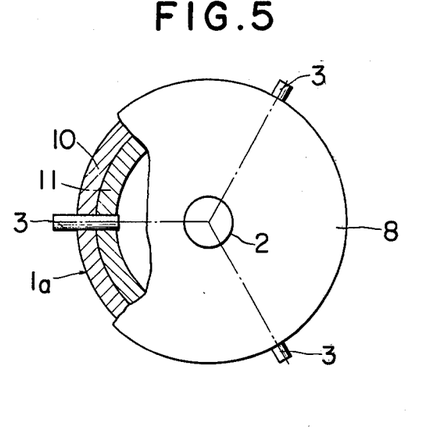
FIG. 5 is a partly exploded plan view of one of the two columns of the oxidation furnace shown in FIG. 3 provided with an inlet for an iron chloride gas showing one example of the state of mounting of nozzles in the case where three oxygen nozzles are used.

FIG. 4 is a side view of the oxidation furnace shown in FIG. 3 as viewed along the direction Z illustrated in FIG. 3, and FIG. 5 is a plan view of the left part of the oxidation furnace shown in FIG. 3 including cylinder 1a for showing one embodiment of the arrangement of oxygen nozzles wherein three oxygen nozzles are disposed on the side wall at 120° interval from each other. The location of the nozzles and the operation principle and manner of the oxidation furnace shown in FIGS. 3 through 5 are substantially the same with those of the oxidation furnace shown in FIGS. 1 and 2 as described hereinabove, but the former type of furnace has advantages such as a low construction cost due to decrease in height, facility of maintenance, facility of withdrawal of iron oxide partly piled on the furnace bottom and minimization of entrainment of iron oxide within the exhaust gas.

In FIG. 3, symbols A and B (including $B_1$ to $B_4$) respectively designate the mixing zone and another reaction zone subsequent to the mixing zone. The length of mixing zone A is as well determined by equation (11).

In comparison with known processes, the process of the invention has the following advantageous features.

(1) The process of the invention has solved the clogging of the furnace caused by the adherence of iron oxide scale and the growth thereof due to sintering, by controlling the introduction of both of the reaction gases, an iron chloride gas and an oxidizing gas, to restrict the turbulence induced by the initial collision therebetween within a limited space within the furnace apart from the furnace walls and to leave a dead space near the furnace walls, thereby to make possible a stable operation over a long period.

(2) The furnace structure and operational manner given by the present invention facilitate the control of the temperature distribution required by reaction thermodynamics and the adjustment of the residence time at each reaction temperature required by reaction kinetics in a compatible manner.

(3) The furnace is of simple construction and high processing capacity, thus minimizing the construction cost.

Thus this invention affords recovery of chlorine from iron chloride with high yield and, moreover, affords stable operation over a long period without forming tenacious adhesive scale of $Fe_2O_3$ on the furnace walls.

In order to indicate more fully the nature and utility of the invention, the following specific examples of practice constituting preferred embodiments of the invention are set forth, it being understood that these examples are presented as illustrative only and that they are not intended to limit the scope of the invention.

EXAMPLE 1

Figure 2:
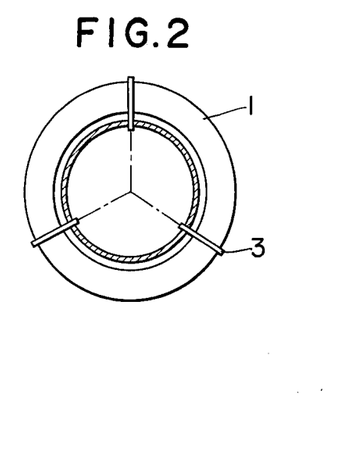
FIG. 2 is a plan view showing one example of the state of mounting of nozzles in the case where three nozzles for injecting an oxidizing gas (hereinafter referred to as "oxygen nozzles") are used.

This example illustrates a case wherein an oxidation furnace as shown in FIG. 1 and oxygen injecting nozzles as shown in FIG. 2 are used. The furnace used had a cylindrical furnace structure 1 of an inner diameter of 0.8 m and an overall furnace length from the top of the furnace to the $Fe_2O_3$ extraction outlet 7 at the bottom thereof of 3.7 m. The diameter of the inlet 2 for the gas containing iron chloride at the top of the furnace was 0.12 m. Three oxygen injection nozzles 3 each of 0.025 m inner diameter were installed with 120° spacing in the furnace side wall at a level 0.3 m below the inlet 2 and with centerlines perpendicularly intersecting the central axis of the furnace 1 at one point thereon.

The temperature in the inlet 2 was maintained at 850° C, and a temperature gradient of decreasing temperature with distance in the downstream direction was established with the temperature being maintained at 600° C in the gas exhaust outlet 6.

Through the inlet 2, a gaseous mixture heated to 850° C and composed of 44.8% of $FeCl_3$, 33.2% of $CO_2$, 0.3% of $Cl_2$, 0.8% of $O_2$, and 20.9% of $N_2$ was blown into the furnace at a flow rate of 660 liter/min. (atmospheric pressure and 850° C). Simultaneously, oxygen preheated to 300° C was injected into the furnace uniformly through the three nozzles 3 at a flow rate of 120 liter/min. (atmospheric pressure and 300° C) and caused to react continuously with the above-described gaseous mixture for 72 hours.

As a result, the reaction product gas taken out through the exhaust pipe 6 was found to have an average composition of 2.2% of $FeCl_3$, 51.5% of $Cl_2$, 27.4% of $CO_2$, 3.0% of $O_2$, and 15.9% of $N_2$, and an average reaction rate of the iron chloride of 94.0% was obtained. The Fe$_2$O$_3$ of the reaction product was found to be adhering in a soft state to the side wall of the furnace downstream from the mixing zone with an average thickness of the order of merely 20 mm. With respect to the mixing zone, an extremely thin layer of powdery iron oxide and absolutely no scale formation was observed. Approximately 250 kg. of Fe$_2$O$_3$ powder was taken out through the Fe$_2$O$_3$ extraction outlet 7, and, in addition, Fe$_2$O$_3$ was discharged as dust through the exhaust pipe 6.

EXAMPLE 2

The oxidation furnace illustrated in FIG. 1 was used and provided with two groups of oxygen injection nozzles, each of three nozzles, respectively at two different levels 0.2 m and 0.6 m from the iron chloride inlet 2, and inclined respectively upward and downward so that all the oxygen nozzles were directed to a point on the central axis of the furnace. Each nozzle was of 0.015 m inner diameter, and the three nozzles in each group were spaced apart 120° of angle around the furnace wall.

Through the inlet 2, a gas containing iron chloride at 900° C containing 50.2% of FeCl$_3$, 37.6% of CO$_2$, and 12.2% of N$_2$ was blown into the furnace at a flow rate of 650 liter/min. (at atmospheric pressure and 900° C). Oxygen preheated to 300° C was injected uniformly through the six oxygen injection nozzles into the furnace at a flow rate of 130 liter/min. (at atmospheric pressure and 300° C). The temperature of the exhaust pipe 6 was 700° C.

As a result, through this exhaust pipe 6, a reaction product gas of an average composition of 50.5% of Cl$_2$, 5.0% of FeCl$_3$, 28.9% of CO$_2$, 6.2% of O$_2$, and 9.4% of N$_2$ was obtained, and a reaction rate of the iron chloride of 87.0% as an average value was obtained. After approximately 120 hours of operation, the interior of the furnace was inspected, whereupon it was found that Fe$_2$O$_3$ had deposited to a thickness of from 20 to 30 mm on the furnace walls downstream from the mixing zone. This Fe$_2$O$_3$ was found to be soft and to readily crumble. The total weight of Fe$_2$O$_3$ deposited on the furnace bottom and that swept off the furnace wall and taken out of the furnace bottom was 380 kg.

EXAMPLE 3

This Example illustrates a case wherein an oxidation furnace as shown in FIGS. 3 through 5 is used. The furnace had two vertical cylindrical structures 1a and 1b of an inner diameter D of respectively 0.8 m. The diameter d of the iron chloride conduit was 0.12 m (d/D = 0.15). The vertical distance x from the internal surface of the end wall 8 to the position of the oxygen nozzles 3 was 0.3 m. Three oxygen nozzles 3 were composed of a single pipe having an inner diameter of 0.012 m, and were disposed horizontally, radially and inwardly on the side wall of the cylinder 1a at an equiangular interval of 120° from each other. The distance between the central axis respectively of the cylindrical structures 1a and 1b was 2.2 m and the cylindrical structures were connected by a hollow connecting member 12 having an equivalent diameter of about 0.6 m. The hollow connecting member 11 had two side walls with an inclination $\theta$ of 60° to a horizontal plane and was provided with an extraction port 14 for withdrawing product iron oxide. All of the interior surfaces of the oxidation furnace 1 including two cylindrical structures 1a and 1b and connecting member 12 were covered with the same lining composed of a layer of insulating material 10 and a layer of chlorine-proofing fire brick 11, and the outermost surfaces of the oxidation furnace were covered with an external plate made of mild steel. The height from the top end wall 8 to the bottom floor of the connecting member 12 measured along the central axis of cylindrical structure 1a was 3.9 m, and the height from the outlet end 9 to the bottom floor of the connecting member 12 measured along the central axis of the cylindrical structure 1b was 4.5 m. Two cooling pipes 13a and 13b were disposed on the side wall of the cylindrical structure 1b respectively at positions 0.7 m and 1.7 m vertically distant from the outlet end wall 9.

At the beginning of the continuous operation, a town gas was burnt with burners injected through the iron chloride conduit 2 and the iron oxide extraction port 14 to preheat the oxidation furnace, thereby pre-setting an approximate temperature distribution of 950° (for mixing zone A), 800° C (for reaction zone B$_1$, the latter half within structure 1a), 750° C) for reaction zone B$_2$, the zone around the intermediate point of connecting member 12), 700° C (for reaction zone B$_3$, the former half within structure 1b), and 600° C (for reaction zone B$_4$, the latter half of structure 1b). The burners were removed and oxygen was injected through the oxygen nozzles 3 thereby to replace the remaining combustion gas with oxygen. After connecting the iron chloride conduit to a source of iron chloride gas, an iron chloride gas having the composition of 48.3% of FeCl$_3$, 36.2% of CO$_2$ and 15.5% of N$_2$ (all by volume) preheated to 950° C was injected vertically downward into the furnace through the iron chloride conduit 2 at a velocity of 3m/sec measured at the tip of the conduit. The Reynolds number Re of the iron chloride gas through the conduit was calculated at 5.8 × 10$^4$ by using a calculated value of viscosity of the iron chloride obtained by using a calculation formula given by Wilke (J. Chem. Physics 18, 517 (1950)). This, in turn, means that the iron chloride gas was fed at the rate of 120 kg/hr and the feed rate of FeCl$_3$ was 95.3 kg/hr.

On the other hand, oxygen (99% purity) as an oxidizing gas preheated to 300° C was injected through the three oxygen nozzles 3 at a rate of 15.5 kg/hr which corresponds to 10% in excess of the theoretical quantity according to reaction formula (5), and at an equal rate for each of the nozzles. In this case, the injection velocity Uo of the oxygen through each nozzle was 14.1 m/sec which, in turn, means the horizontal velocity of the free turbulence of the oxygen Uc of 2.6 m/sec and the ratio Uc/U of 0.87. At the root of each nozzle, a flowmeter was provided and the oxygen feed rate through each nozzle was controlled at 2.1 l/sec (300° C, atmospheric pressure).

The exhaust gas from the oxidation furnace was discharged through the exhaust pipe 6, processed in an oxidation furnace gas treating process and conveyed to a chlorine liquefaction process by means of connecting pipes provided with a compressor. As a result thereof, the inner pressure of the oxidation furnace was maintained at a slight vacuum of about 10 to 30 mmH$_2$O.

After a 48 hours of continuous operation, several gas samples were taken through sampling holes provided on the side wall of the furnace. The conversion of FeCl$_3$ was calculated based on the analytical data of the gas samples thus obtained. The conversion data as well as the temperature distribution was shown in FIG. 6.

During the continuous operation, a part of the iron oxide in a powder form piled on the bottom floor of the connecting member 12, which was withdrawn intermittently with an interval of 8 hours to a closed container through the iron oxide withdrawal port 14.

Furthermore, in order to maintain the temperatures of zones $B_3$ and $B_4$ respectively at 700° and 600° C, a fine powder form of iron oxide containing 21.8% by weight of unreacted $FeCl_3$ recovered from a bag filter in the oxidation furnace gas treating process was injected through the cooling pipes 13a and 13b and, according to necessity, a powder form of the iron oxide recovered from the closed container was injected through the cooling pipe 13b intermittently into the furnace.

According to the above-described manner, 14 days of continuous operation was carried out, during which no clogging was observed. After the operation, the interior of the furnace was inspected, whereupon it was found that no appreciable adhesion of sintered iron oxide scale had been formed throughout the furnace although powdery iron oxide had deposited to a thickness of 20 to 30 mm on the furnace wall in the reaction zone $B_1$ subsequent to the mixing zone A. However, this iron oxide was soft, and readily crumbled, and the layer of the iron oxide thus deposited was found to demonstrate that some parts thereof had fallen down during the operation. Further, on the furnace wall in the zones thereafter, i.e. zones $B_3$ and $B_4$, a layer of powdery iron oxide deposit of still less thickness was merely observed.

With respect to the mixing zone A, an extremely thin layer of powdery iron oxide deposit was merely observed, and absolutely no scale formation was observed throughout the mixing zone.

I claim:

1. In the process for the recovery of chlorine by causing an oxidizing gas selected from the group consisting of oxygen and a gas containing molecular oxygen and as the predominant constituent to react with an iron chloride gas selected from the group consisting of iron chloride in the vapor state and a gas containing iron chloride as the predominant constituent within an oxidation furnace, the improvement according to which the initial meeting of the iron chloride gas and the oxidizing gas is caused to occur in an unobstructed spaced within the oxidation furnace, and the oxidizing gas is introduced into the furnace in a direction and at a velocity such that turbulent flow induced by collision of said two gases will not reach the furnace walls, said improvement being achieved by conducting the reaction in an oxidation furnace which comprises:

a closed furnace structure of the vertical cylindrical type having a diameter of D $(m)$ comprising a top end wall, a side wall and a bottom extraction port for withdrawing the product iron oxide, an iron chloride conduit for injecting the iron chloride gas having a diameter of d $(m)$ and being mounted at the central part of said top end wall coaxially with the furnace structure, a plurality of oxygen nozzles for injecting the oxidizing gas said nozzles having a radius of $v_0(m)$ and being disposed radially and inwardly on said side wall at equiangular intervals from each other, the tips of the oxygen nozzles being directed to a point on the axis of the furnace structure, and an exhaust pipe for discharging product gases out of the oxidation furnace said pipe being disposed at a position on the side wall close to the lower end of the side wall, wherein d and D is determined to satisfy the equation $$d/D = 0.1 \text{ to } 0.25 \tag{1}$$

the iron chloride gas being injected into the oxidation furnace downwardly along the axis of the oxidation furnace at a velocity U (m/sec) satisfying the equation $$Re = Ud/\nu = (2.1 \text{ to } 8.9) \times 10^4 \tag{2}$$

wherein Re denotes the Reynolds number of the iron chloride gas passing through the iron chloride conduit, $\nu$ is the kinematic viscosity of the iron chloride gas; and the oxidizing gas being injected into the oxidation furnace through the oxygen nozzles at a substantially equal velocity Uo (m/sec) satisfying the formulas $$0.1 \leq Uc/U \leq 6 \tag{3}$$

and $$Uo = (DUc)/(24.8\nu_o) \tag{4}$$

wherein Uc (m/sec) denotes the velocity of the free turbulence of the oxidizing gas at the central axis of the furnace, whereby deposition of $Fe_2O_3$ on the furnace walls is minimized.

2. A process as in claim 1 in which all of said plurality of oxygen nozzles are arranged to lie on a plane perpendicular to the axis of the oxidation furnace.

3. A process as in claim 1 in which said plurality of oxygen nozzles are divided into two vertically spaced sets of nozzles, each set of nozzles being disposed at the same height on the furnace side wall, and the upper set of nozzles being disposed to have a downward inclination and the lower set of nozzles being disposed to have an upward inclination, the angles of both the upward and downward inclinations being substantially the same with each other, so that all the oxygen nozzles will be directed to a point on the central axis of the oxidation furnace.

4. A process as in claim 1 in which the oxygen nozzles are disposed on the furnace side wall at a vertical position x $(m)$ distant from the upper end of the side wall satisfying the equation $$x = 0.176 \times (1 \text{ to } 3) D (m) \tag{9}$$

5. A process as in claim 1 in which the temperature distribution along the length of the oxidation furnace is controlled by controlling the thickness of the insulation material covering the side wall of the furnace so that the temperature within the furnace will be within the range of 700° to 1000° C at the upper stream end of the reaction zone and within the range of 500° to 700° C at the lower stream end of the reaction zone.

6. A process as in claim 1 in which the temperature distribution along the length of the oxidation furnace is controlled by recycling unreacted iron chloride in the exhaust gas from the oxidation furnace with a conveying gas through a cooling pipe mounted on the side wall of the oxidation furnace so that the temperature in the furnace will be within the range of 700° to 1000° C at the upper stream end of the reaction zone and within the range of 500° to 700° C at the lower stream end of the reaction zone.

7. In the process for the recovery of chlorine by causing an oxidizing gas selected from the group consisting of oxygen and a gas containing molecular oxygen as the predominant constituent to react with an iron chloride gas selected from the group consisting of iron chloride in the vapor state and a gas containing iron chloride as the predominant constituent within an oxidation furnace, the improvement according to which the initial meeting of the iron chloride gas and the oxidizing gas is caused to occur in an unobstructed space within the oxidation furnace, and the oxidizing gas is introduced into the furnace in a direction and at a velocity such that turbulent flow induced by collision of said two gases will not reach the furnace walls, said improvement being achieved by conducting the reaction in an oxidation furnace which comprises:

a closed furnace structure comprising a first cylinder and a second cylinder, each of the cylinders having a top end wall and a side wall, and connected with a hollow connecting member communicatively with each other at their bottom ends, said connecting member constituting the bottom floor of the oxidation furnace, an iron chloride conduit mounted at the central part of the top end wall of the first cylinder, a plurality of oxygen nozzles having a radius of $v_o(m)$ disposed radially and inwardly on the side wall of the first cylinder at equiangular intervals from each other, the tips of the nozzles being directed to a point on the axis of the first cylinder, and an exhaust pipe for discharging product gases out of the oxidation furnace disposed at a position on the side wall of the second cylinder near the upper end of the side wall, wherein the inner diameter of the iron chloride conduit $d$ $(m)$ and the inner diameter $D(m)$ of the first cylinder are determined to satisfy the equation $$d/D = 0.1 \text{ to } 0.25 \tag{1};$$

the iron chloride gas being injected into the oxidation furnace downwardly along the axis of the oxidation furnace at a velocity U (m/sec) satisfying the equation $$Re = Ud/v = (2.1 \text{ to } 8.9) \times 10^4$$

wherein $Re$ denotes the Reynolds number of the iron chloride gas passing through the iron chloride conduit, and $v$ is the kinematic viscosity of the iron chloride gas; and the oxidizing gas being injected into the first cylinder through the oxygen nozzles at a substantially equal velocity $Uo$ (m/sec) satisfying the formulas $$0.1 \leq Uc/U \leq 6 \tag{3}$$

and $$Uo = (DUc)/(24.8v_o) \tag{4}$$

wherein $Uc$ (m/sec) denotes the velocity of the free turbulence of the oxidizing gas at the central axis of the furnace, whereby deposition of $Fe_2O_3$ on the furnace walls is minimized.

8. A process as in claim 7 in which all of said plurality of oxygen nozzles are arranged to lie on a plane perpendicular to the axis of the first cylinder.

9. A process as in claim 7 in which said plurality of oxygen nozzles are divided into two vertically spaced sets of nozzles, each set of nozzles being disposed at the same height on the side wall of the first cylinder, and the upper set of nozzles being disposed to have a downward inclination and the lower set of nozzles being disposed to have an upward inclination, the angles of both the upward and downward inclinations being substantially the same with each other, so that all the oxygen nozzles are directed to a point on the central axis of the first cylinder.

10. A process as in claim 7 in which the oxygen nozzles are disposed on the side wall of the first cylinder at a vertical position $x$ $(m)$ distant from the upper end of the side wall satisfying the equation $$x = 0.176 \times (1 \text{ to } 3) D (m) \tag{9}.$$

* * * * *